United States Patent [19]

Fries, Jr.

[11] 4,180,180

[45] Dec. 25, 1979

[54] APPARATUS AND METHOD FOR AUTOMATICALLY DISPENSING FLEXIBLE CONTAINERS

[75] Inventor: Carl Fries, Jr., Philadelphia, Pa.

[73] Assignee: International Paper Company, New York, N.Y.

[21] Appl. No.: 869,505

[22] Filed: Jan. 16, 1978

[51] Int. Cl.² ............................................. B65G 59/10
[52] U.S. Cl. ........................................ 221/1; 221/222
[58] Field of Search ............. 221/221, 222, 223, 297, 221/40, 42, 39, 43, 1; 214/8.5 C, 8.5 H

[56] References Cited

U.S. PATENT DOCUMENTS

| | | | |
|---|---|---|---|
| 1,907,713 | 5/1933 | Benson | 221/222 |
| 1,907,714 | 5/1933 | Benson | 221/222 |
| 2,297,847 | 10/1942 | Wilckens et al. | 214/8.5 |
| 2,692,691 | 10/1954 | Harriss et al. | 214/8.5 |
| 2,721,002 | 10/1955 | Smith | 221/222 |
| 3,090,523 | 5/1963 | Packman | 221/36 |
| 3,122,267 | 2/1964 | Edwards | 221/1 |
| 3,198,382 | 8/1965 | Cleary | 221/222 |
| 3,741,410 | 6/1973 | Henschke et al. | 214/8.5 |

FOREIGN PATENT DOCUMENTS 225,606 12/1968 U.S.S.R. .................................. 221/222

*Primary Examiner*—Stanley H. Tollberg
*Attorney, Agent, or Firm*—Thomas L. Giannetti

[57] ABSTRACT

Disclosed is an apparatus and method for dispensing flexible, elastic flanged containers from a nested stack of such containers. In that apparatus and method, the sidewall of the bottommost container is compressed causing the remainder of the stack of containers to move vertically upward and a separator is inserted into the gap created between the flange of the bottommost container and the flange of the next-to-the bottommost container. Thereafter, the bottommost container is dispensed from the remainder of the stack of containers. In the preferred embodiment, compression is provided by a set of cammed spacemaker blades.

28 Claims, 10 Drawing Figures

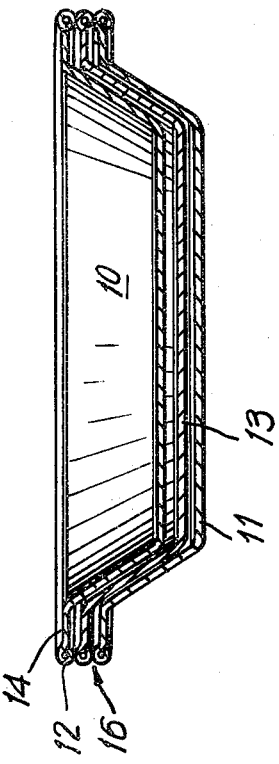
FIG. 1 PRIOR ART
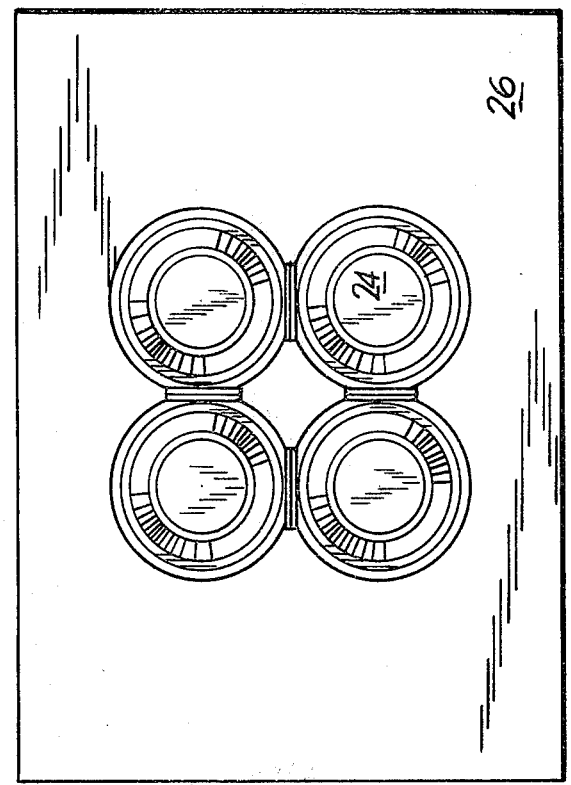
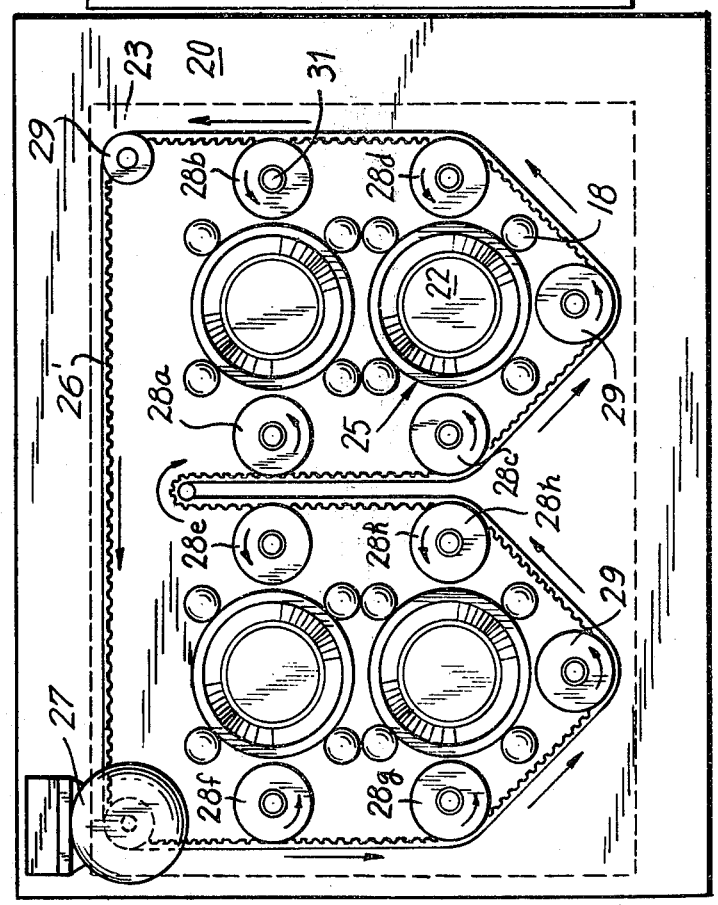
FIG. 2

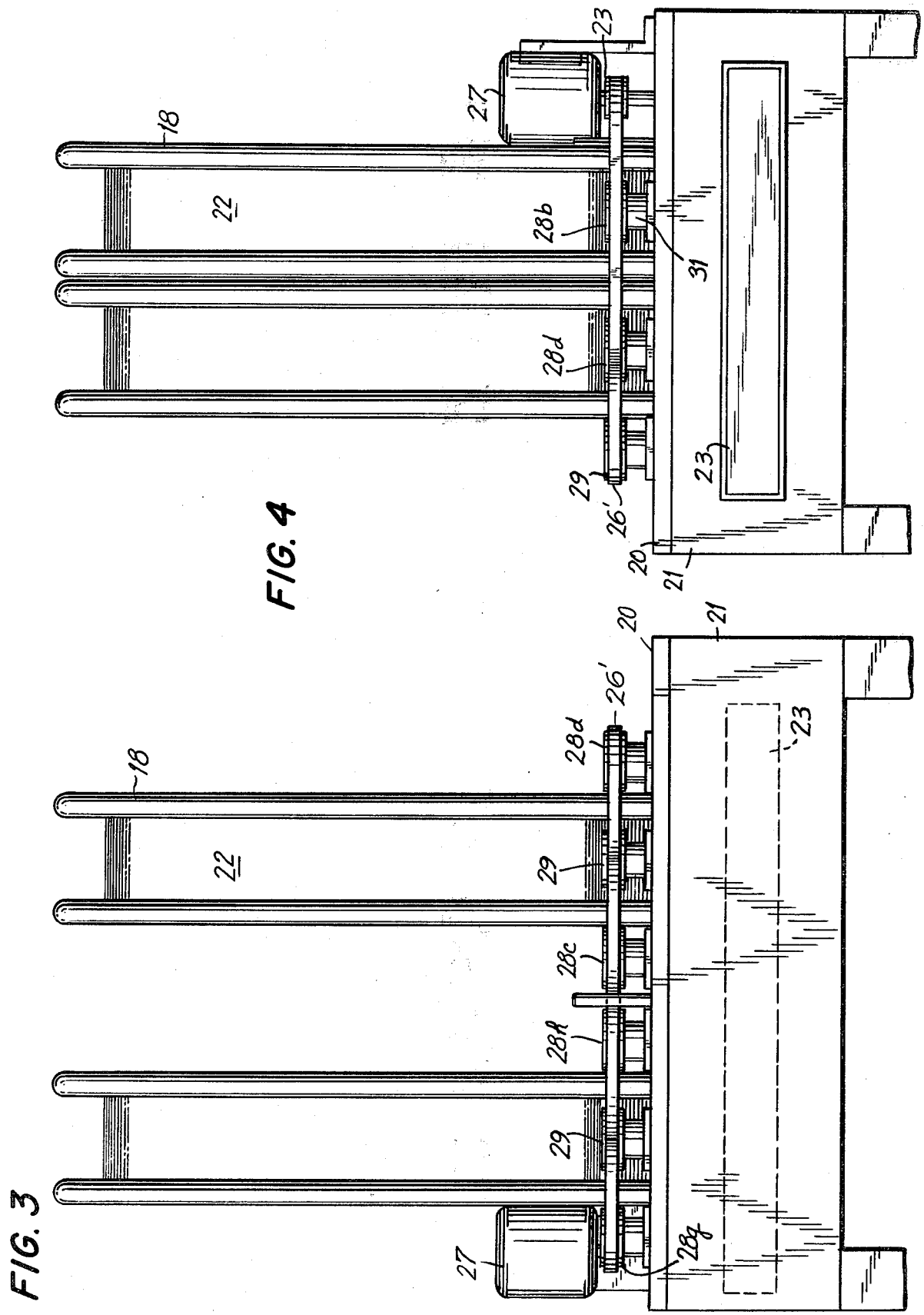

FIG. 5
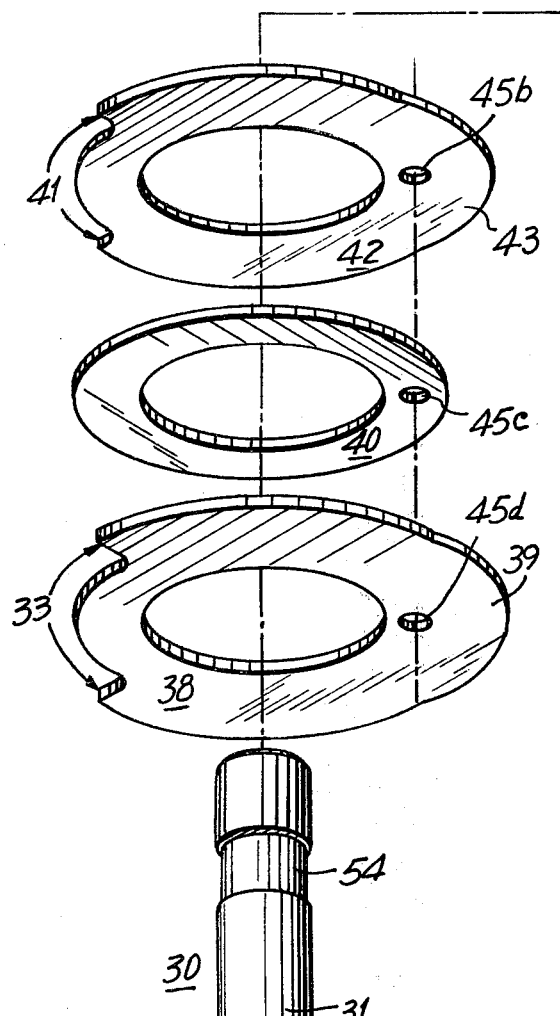
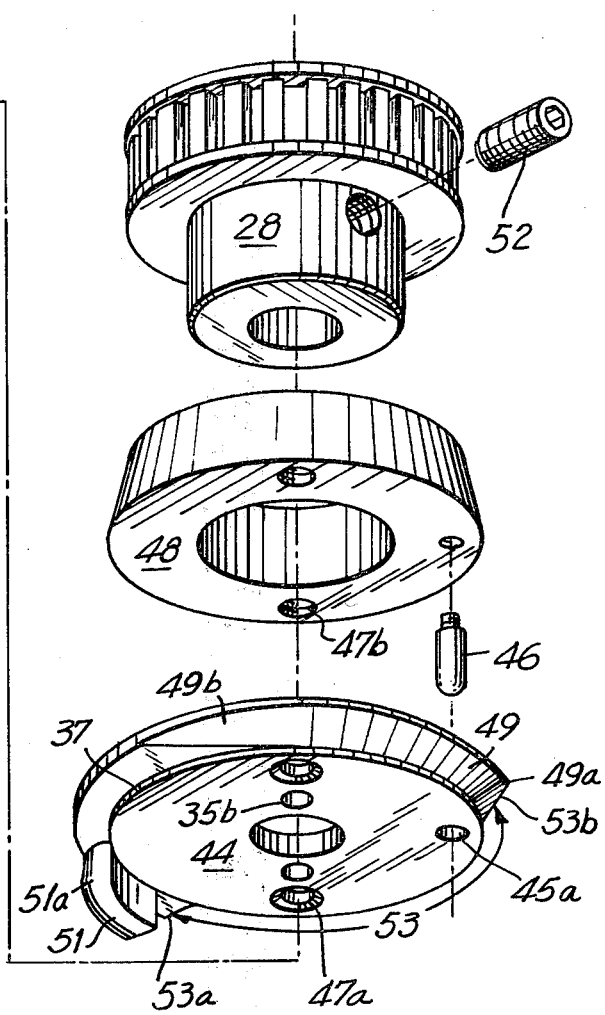
FIG. 6
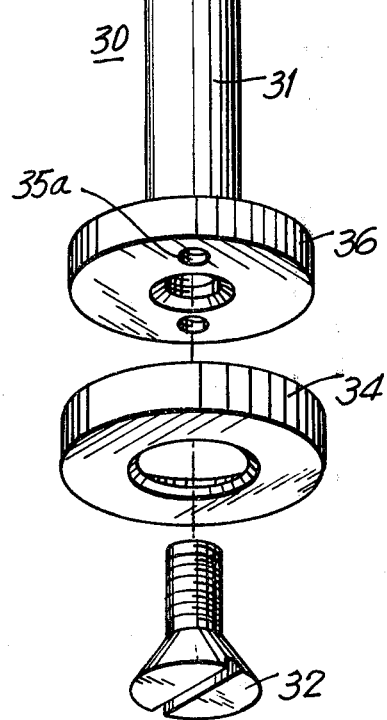
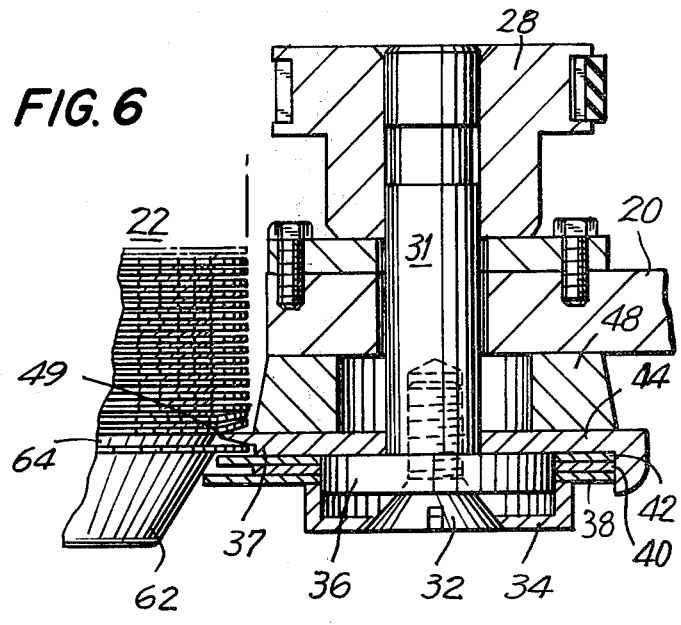

APPARATUS AND METHOD FOR AUTOMATICALLY DISPENSING FLEXIBLE CONTAINERS

BACKGROUND OF THE INVENTION

1. Field to Which the Invention Pertains

This invention relates to the automatic dispensing of flexible and elastic containers from nested stacks of such containers, and particularly to the dispensing of pressed or drawn flanged paperboard containers having a water or grease resistant coating, for example, polyethylene or polyethylene coated with polyester, on the inner wall of the container. Such containers are increasingly being used rather than metal foil containers in the food processing industry for a wide range of products, including pies and other bakery items. A chief advantage of using paperboard for containers rather than metal foil is that foods contained in the paperboard containers can be cooked in a microwave oven as well as in a conventional oven. With metal foil containers, microwave cooking equipment cannot be used.

In many commercial food processing applications, e.g., in continuous pie making machines, containers are automatically dispensed one at a time from the bottom of a nested stack of containers and deposited onto holders on a traveling conveyor. The conveyor carries the containers through the other operations incident to the food processing, including at some point the step of filling the empty containers with food. It is apparent that in such an environment a reliable and accurate method must be employed for automatically dispensing the containers individually one at a time from the bottom of the nested stack of containers and for depositing them on the traveling plate holders or other continuously moving carriers. Moreover, the dispensing apparatus and method should be accurate and reliable at the rapid dispensing speeds required for production line applications, e.g., up to 150 cycles per minute (cpm) per stack of containers.

The method of dispensing metal foil containers which is commonly used in continuous food processing machinery uses continuously rotating cooperating screws or rotors which separate and strip the bottommost plate from a vertical nested container stack, while supporting the penultimate plate and the remainder of the stack. The screws or rotors used with screw-type dispensing apparatus typically comprise flat, annular plates having stepped flanges and channels to separate and dispense the bottommost plate in the stack.

Conventional screw-type dispensing apparatus used for metal foil plates and containers, however, cannot be used without modification for pressed or drawn paperboard containers because of structural differences between the metal and the paperboard containers. Most notable among those differences is the presence in the metal containers of an outstanding bead on the outer perimeter of the flange of the container. When the beaded metal containers are nested and stacked, the beads act as spacers to create a space or cleavage between adjacent flanges. A separator blade carried, for example, by a rotor of a screw-type dispensing machine can easily be inserted into the cleavage between the flanges of the bottommost and penultimate containers to separate the bottommost container from and to support the remainder of the stack. It is not feasible from a manufacturing standpoint to provide beaded flanges on the pressed paperboard containers of the type used with the present invention. Beaded containers, moreover, require more shipping space. Thus there is no bead, and consequently no cleavage, or other space between adjacent flanges of nested drawn or pressed paperboard containers into which a separator blade can easily be inserted.

Paperboard containers, moreover, are generally heavier than metal foil containers, making it even more difficult to insert the separator blade between the flanges of the bottommost and penultimate paperboard containers. That is because, when the nested stack of paperboard containers is supported for dispensing on the rotors of a screw-type dispensing apparatus, the flange of the bottommost container is supported by the rotors. That flange is bent upward at the points of support due to the weight of the stack bearing down on the support points, causing the flange of the bottommost container to touch the flange of the penultimate container at those points. Thus there is no space between the flanges of the bottommost container and the penultimate container into which a separator blade carried by each rotor can be inserted.

And, aluminum and other metal containers can be manufactured to more exact tolerances than pressed or drawn paperboard containers. Thus pressed or drawn paperboard containers exhibit wider variations in diameter, flange size and other dimensions, making them more difficult to dispense reliably than metal containers.

My invention overcomes the above problems inherent in using automatic screw-type dispensing apparatus to dispense pressed or drawn paperboard containers. According to a preferred embodiment of the present invention, the sidewalls of the bottommost container of a vertical stack of nested paperboard containers are inwardly compressed to deform the bottommost container and to cause the remainder of the stack, nested in that bottommost container, to rise vertically. The vertical rise of the stack creates a space or gap between the flanges of the bottommost and penultimate containers into which separator blades are inserted. When the separator blades are inserted, compression is relaxed, and the bottommost container, being elastic, substantially returns to its original shape and is dispensed, i.e., it is released and permitted to drop onto a conveyor-transported holder. When compression is relaxed, the remainder of the stack moves vertically downward and comes to rest upon the separator blade. In a preferred embodiment of my invention, compression is achieved by one or more cammed spacemaker blades which, along with the separator blades, are components of the rotors of a rotating screw-type plate dispensing apparatus.

2. Description of the Prior Art

The art has attempted to solve the problems incident to dispensing drawn or pressed paperboard containers of the type used in my invention principally by resorting to the use of vacuum-type dispensers. In one variation—the vacuum pick and slide method—a suction source carried by a movable arm is placed in contact with the bottommost plate on the stack. The force established between the suction source and the bottommost plate allows the bottommost plate to be separated or "picked" from the stack by automatic movement of the arm. Once separated, the plate is deposited at the top of an inclined ramp, from which the plate slides down and into a plate holder timed to arrive at the bottom of the ramp to receive the plate. In another variation—the vacuum pick and place method—the bottommost plate is picked from the stack by a suction source carried by a movable arm, and placed directly in the plate holder by the moving arm. These vacuum methods are slower, less reliable, and less economical than the screw-type dispenser of my invention. Moreover, my invention can be used with equipment presently using conventional screw-type dispensing apparatus. Add the present invention exploits the structural elasticity of pressed or drawn paperboard containers—a property which aluminum containers do not possess to any significant extent.

I am aware that the art discloses screw-type paper cup dispensing apparatus wherein the beaded rim of the bottommost cup in a nested stack of cups is compressed to overcome the tendency of the bottommost cup to adhere to the rest of the stack, e.g., U.S. Pat. Nos. 1,907,713 and 1,907,714, both to Benson. According to my invention, however, the sidewalls of the containers, not their flanges, are compressed. And in my invention this compression is applied to the walls of the bottommost container in the nested stack to create a space between the flanges for receiving a separator blade, not, as in Benson's patents, to overcome the adhesion force between containers.

The paperboard containers used with my invention have no tendency to adhere to one another, as do Benson's cups. That is because the plates and containers used with my invention, unlike Benson's containters, have walls which slope inwardly from top to bottom, and which are not substantially vertical. Moreover, the polyethylene or polyethylene and polyester with which the inner walls of the containers used with my invention are preferably coated further diminishes the adhesion between the containers.

Moreover, the cups shown in the Benson patents stack with spaces between the beaded flanges of adjacent cups. Thus, contrary to the present invention, Benson does not compress the sidewalls of the bottommost container to create a space for receiving a separator blade.

In summary, prior screw-type dispensing apparatus or methods are not suitable for dispensing flexible, elastic pressed or drawn paperboard containers of the type used in my invention because they do not create a space between the flanges of the bottommost and penultimate containers for receiving a separator blade.

SUMMARY OF THE INVENTION

It is an object of this invention to provide a method and apparatus for economically and reliably dispensing flexible and elastic containers. Preferably such containers are made of pressed or drawn paperboard and are coated on their inner wall with a water or grease resistent coating, e.g., polyethylene or polyethylene coated with polyester.

It is a further object of this invention to economically and reliably dispense at high speeds, e.g., 150 cycles per minute for a single stack dispenser, or 600 cycles per minute for a four-stack dispenser.

It is still a further object of this invention to dispense pressed or drawn paperboard containers using a screw-type dispenser.

It is another object of this invention to provide a dispensing method and apparatus which can be used with equipment presently using conventional screw-type dispensing apparatus, and especially such equipment used in the food processing industry.

According to my invention, a process and apparatus is provided for dispensing the bottommost container in a nested stack of flexible, elastic containers. More specifically, the process of the present invention comprises the following steps: (a) supporting a nested stack of flexible, elastic containers, each of said containers comprising a sloped side wall and a flange extending outward from the side wall; (b) separating the flange of the bottommost container from the flange of the second to the bottommost container by compressing the side wall of the bottommost container; (c) inserting supporting means in the space thereby provided between the flange of the bottommost container and the flange of the second to bottommost container; (d) decompressing the side wall of the bottommost container; and (e) dispensing the bottommost container from the remainder of the containers, preferably by removing support from the bottommost container while at the same time maintaining support for the remainder of the containers. Thereafter steps (a)–(e) may be repeated to dispense additional containers from the nested stack of containers.

In a preferred embodiment of my invention, the sidewalls are compressed by cammed spacemaker blades.

DESCRIPTION OF THE DRAWINGS

FIG. 1 is an elevational view in cross-section of a nested stack of rimmed or beaded containers, such as the aluminum foil pans used with prior art screw-type dispensing apparatus and methods.

FIG. 2 is a plan view of a four-stack screw-type dispensing apparatus embodying the present invention.

FIG. 3 is a side elevational view of the dispensing apparatus of FIG. 2.

FIG. 4 is a front elevational view of the dispensing apparatus of FIG. 2.

FIG. 5 is an exploded perspective view of the rotor unit of the present invention, showing the separator and cammed spacemaker blades.

FIG. 6 is an isolated view of the rotor, shown in partial cross-section, and a nested stack of containers showing the separator blade interposed between the flanges of bottommost and penultimate container.

DESCRIPTION OF THE PREFERRED EMBODIMENTS

Figure 7:
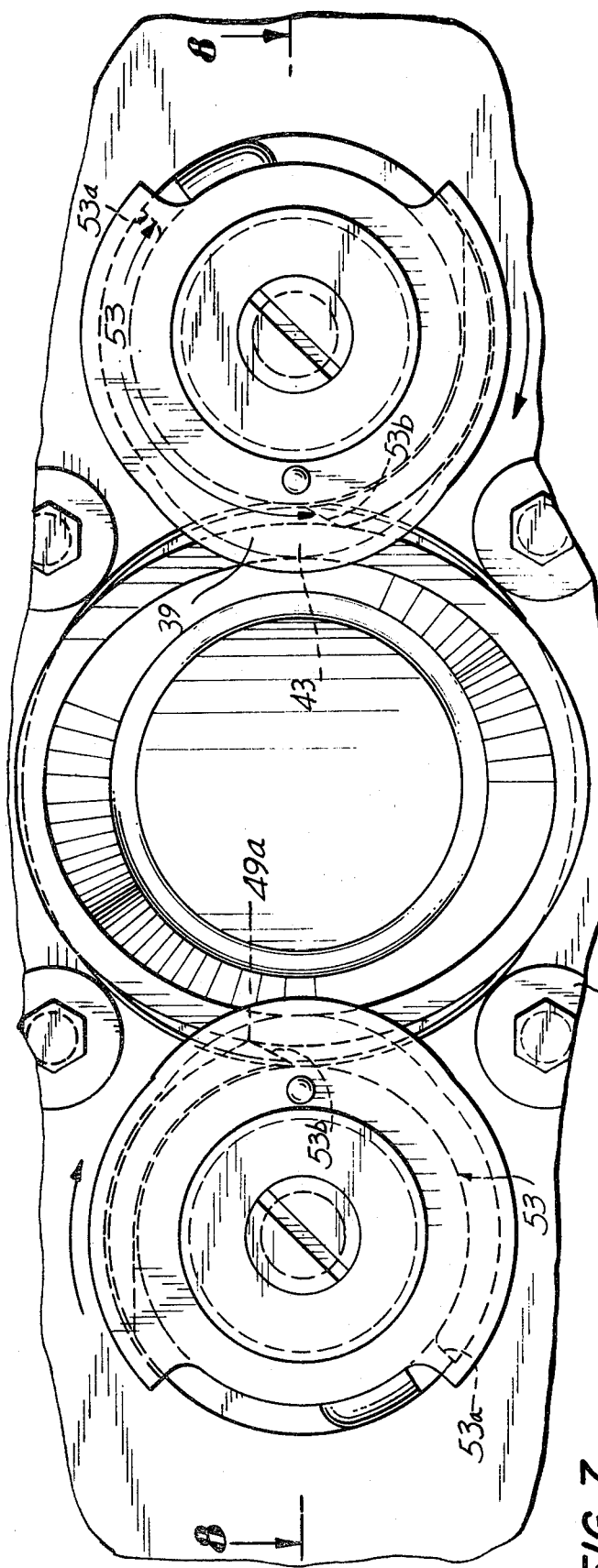
FIG. 7 is an enlarged bottom view of one stack of the dispensing apparatus of FIG. 2, showing in phantom line the deformation of the bottommost plate under compression by the spacemaker cams on the rotor.

Referring to FIG. 1, there is shown a nested stack 10 of plates or pans typically made of aluminum foil and of the configuration used in prior automatic screw-type dispensing apparatus. Beaded rims 12 act as spacers between the plate flanges 14, creating cleavages 16 between the flanges, including those of the bottommost plate 11 and penultimate plate 13. In prior conventional screw-type dispensing apparatus, the bottommost plate is separated and dispensed from the nested stack by inserting separator blades carried by coacting rotors into the cleavage between the bottommost plate and the next-to-the bottommost plate and thereafter dispensing the bottommost plate from the remainder of the stack. Such prior automatic screw-type dispensing apparatus cannot be used to dispense pressed or drawn paperboard plates because, as can best be seen in FIG. 10, the flanges of the flexible, elastic, pressed or drawn paperboard plates shown in nested stack 22 do not have beaded rims with the result that the nested plates do not have cleavages, nor do those plates have spaces between their flanges sufficiently large to receive separator blades. It will be appreciated that in FIGS. 6, 8, 10 the spacing between the flanges of the plates is not drawn to scale, the actual spacing varying from no space to approximately 1/64th inch.

Figure 8:
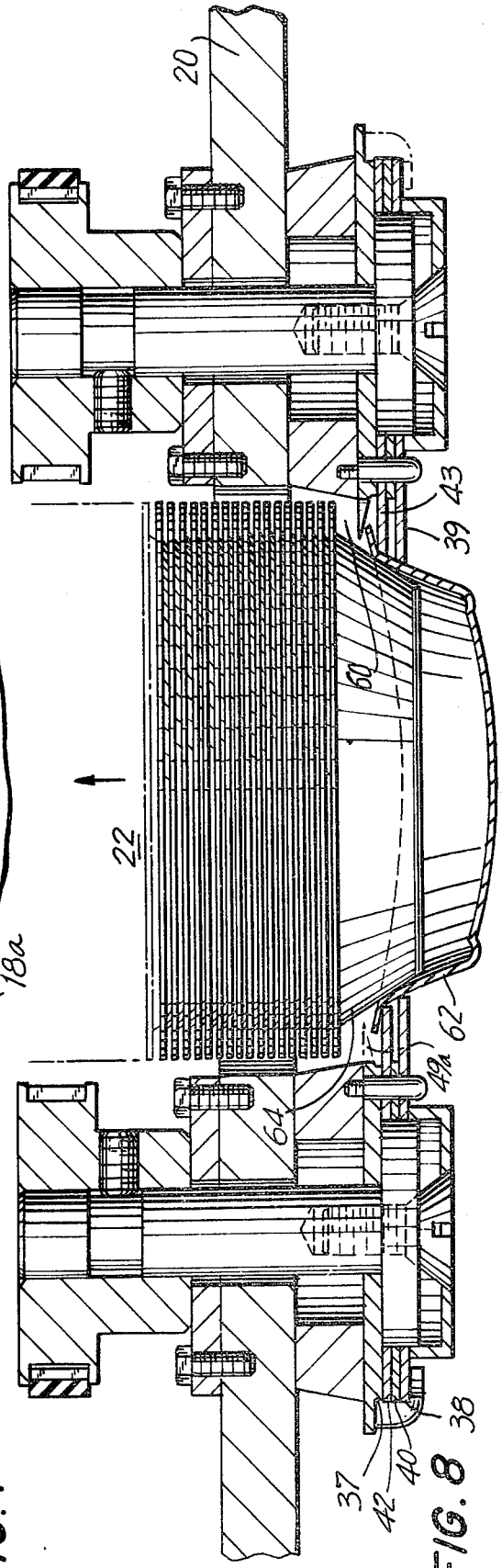
FIG. 8 is an elevational view, partially cross-sectioned, taken along line 8—8 in FIG. 7.
Figures 9, 10:
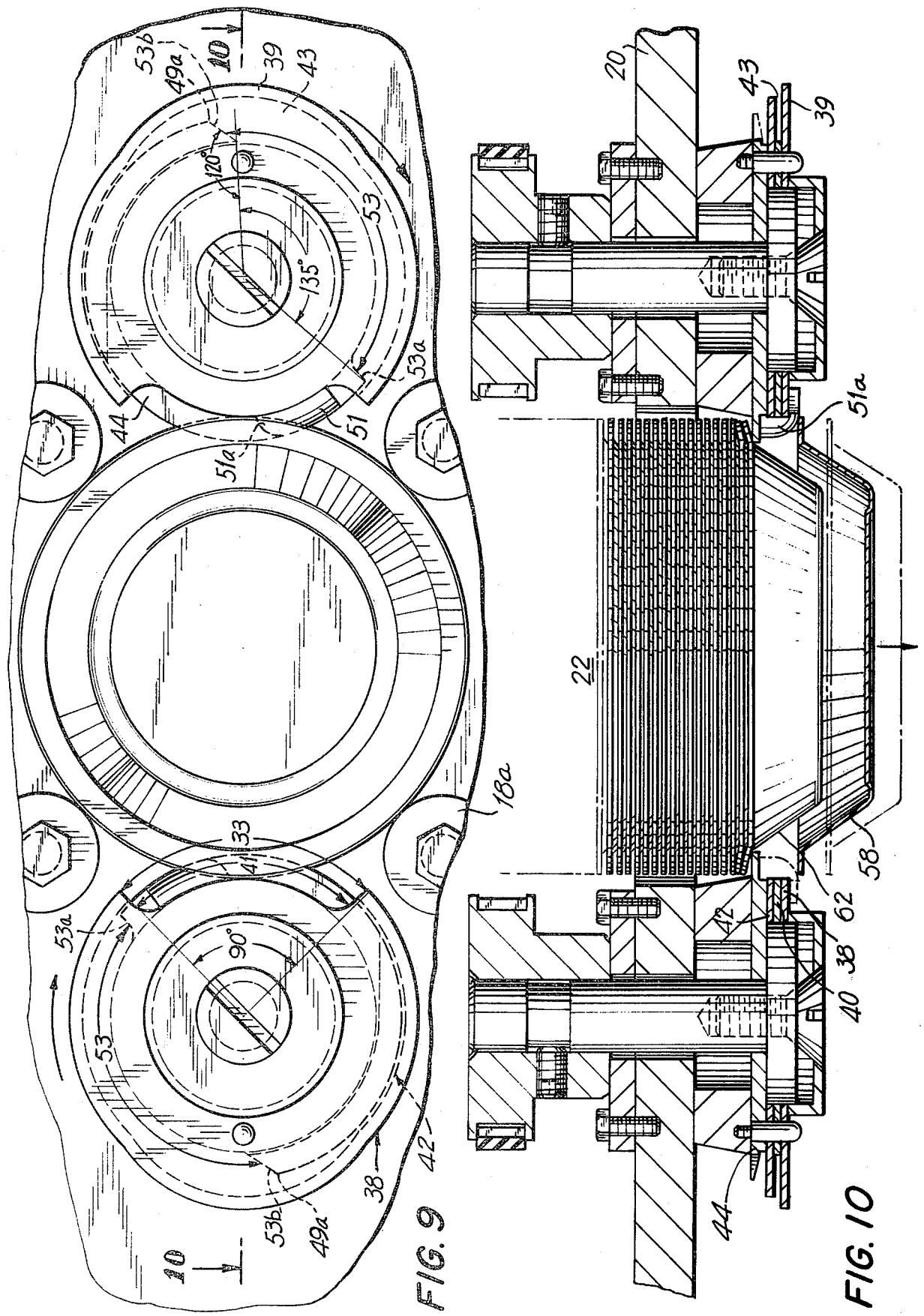
FIG. 9 is an enlarged bottom view of one stack of the dispensing apparatus of FIG. 2, showing the bottommost plate after compression has been relaxed just as it is being dispensed.
FIG. 10 is an elevational view, partially cross-sectioned, taken along line 10—10 in FIG. 9, showing in phantom the bottommost plate being dispensed.

Referring now to FIGS. 2, 3 and 4, there is shown an exemplary automatic screw-type dispensing apparatus embodying the present invention. For the purposes of illustration, this apparatus has four nested stacks of plates 22, each stack being provided with separate dispensing means. The stack configuration shown in FIGS. 2, 3 and 4 might be used, for example, in a continuous pie making process in a bakery. The vertical nested stacks 22 are confined by columns 18, projecting upwardly from, and supported by, bed plate 20. Columns 18 also have extensions 18a projecting downward below bed plate 20, as best seen in FIGS. 8, 10. Bed plate 20 preferably is mounted on base 21 for support. One set of columns for each stack of containers is preferably provided, the columns in each set being arranged to accommodate the shape of the containers being dispensed. For dispensing circular plates, for example, the columns are arranged in a square, as shown in FIG. 2. It will be appreciated, however, that other column arrangements can be used to accommodate other container shapes, e.g., for square or rectangular containers. Columns 18 and their downward-projecting extensions 18a are positioned to allow room for deformation of the bottommost container when that container is compressed in the manner described below.

Each nested stack of plates 22 rests on a dispensing mechanism contained below bed plate 20, and described below. The plate stacks extend vertically upward from the dispensing mechanism through suitably shaped apertures 25 in the bed plate. The dispensing apparatus drops one plate into each of plate holders 24 carried by conveyor 26 passing beneath stacks 22. The conveyor travels through horizontal aperture 23 in base 21 (see FIGS. 3, 4) in the direction shown by the arrow in FIG. 2. The dispensing mechanism for each stack is timed to release its bottommost plate just as an empty plate holder arrives beneath that stack. This timing of the release of the plates is accomplished by methods which are well-known to the dispensing art. After passing beneath the dispensing apparatus and receiving empty plates, the plate holders are carried by the conveyor belt to subsequent steps of the food processing.

Also supported by bed plate 20 are drive pulleys 28a–28h, mounted on vertical shafts 31. The shafts extend downward through bed plate 20 and are journaled for rotation with respect to that bed plate.

The principles of operation of a preferred embodiment of the present invention in a screw-type dispensing apparatus, which will be considered in greater detail below, can be generally described as follows. Each plate stack 22 is supported by two or more cooperating rotating screws or rotors, identical in configuration, which engage and support the flange of the bottommost plate in the stack. The cooperating rotors are driven counterclockwise (as viewed from above as shown by arrows in FIG. 2) at the same rate in synchronized relationship. On complete revolution of the rotors results in the dispensing of the bottommost plate in the stack.

Each rotor has a separator blade and one or more cammed spacemaker blades below the separator blade, all affixed to the rotor shaft for rotation with the shaft, and vertically spaced from one another. The rotors can be initially positioned so that the flange of bottommost plate is supported on the separator blades. As the rotors are simultaneously turned counterclockwise from this initial position, the following sequence occurs:

(a) The stack drops down from the separator blade to the top of the uppermost spacemaker blade as a cutaway section in the margin of each separator blade is rotated under the flange of the bottommost plate;

(b) The bottommost plate is compressed by the lobes of the cammed spacemaker blades impinging on the sidewalls of that plate which causes the flanges of the bottommost and penultimate plate to separate;

(c) The separator blade is positioned in the space created between the flanges of the bottommost and penultimate plates;

(d) The bottommost plate is decompressed by rotating the lobes of the cammed spacemaker blades out of contact with the sidewalls of that plate, permitting it to return substantially to its original shape, and causing the remainder of the stack to descend vertically until the flange of penultimate plate rests on the separator blades; and (e) The bottommost plate is dispensed as a cutaway section in each spacemaker blade is rotated under the flange of the bottommost plate.

After step (e), the apparatus is once again in the initial position described above, and steps (a)–(e) can be repeated to dispense another plate.

Referring now to FIG. 5, there is shown a rotor or screw 30 for use in a rotating screw-type dispensing apparatus embodying the present invention. On the lower end of shaft 31 of rotor 30 there is formed a circular flange 36 having a diameter greater than that of the shaft. Arranged on the shaft, as shown in FIG. 5, are the components which, in cooperation with identical sets of components in one or more coacting rotors, accomplish the dispensing of the individual containers. Mounted on the top of the shaft is drive pulley 28, preferably being held in place by set screw 52 engaging recess 54 in the shaft, the pulley being centrally bored to receive the shaft end. Pulley 28 can be any one of pulleys 28a–28h shown in FIG. 2.

Below the pulley on the shaft is collar 48, which preferably is centrally bored to a diameter greater than that of the shaft, and is preferably tapered from bottom to top.

Located below collar 48 on the shaft is separator blade 44. The lower marginal edge of separator blade 44 is characterized by bladed edge 49—a tapered, beveled surface having a thin, pointed leading edge 49a and a thicker, trailing edge 49b. The bladed edge of the separator blade facilitates separation of the plate to be dispensed—the bottommost plate—from the remainder of the stack, because the thin leading edge 49a of separator blade 44 can readily be inserted into a gap created between the flanges of the bottommost and penultimate plates by compression of the bottommost plate.

A substantial portion (approximately 135°, as shown in FIG. 9) of the margin of the separator blade is cut away to provide a cutout section 53, having an arcuate leading edge 52a and a sloped trailing edge 53b. The cutout section, its leading and trailing edges are best seen in FIGS. 7 and 9. Trailing edge 53b of the cutout section coincides with, and is, in fact, the thin leading edge 49a of the tapered beveled surface of the separator blade. The preferred angle between sloped trailing edge 53b and the separator blade radius is approximately 120°, as shown in FIG. 9.

As shown in FIG. 5, a downwardly-projecting dispensing lobe 51 having a rounded leading edge 51a is preferably provided on the lower surface of the separator blade on the outer margin of the blade near leading edge 53a of the cutout section.

Collar 48 is concentrically secured to the top of separator blade 44 by screws (not shown) passing through holes 47a in the separator blade and engaging threaded holes 47b in the collar. Holes 47a may be countersunk to receive the screw heads.

The separator blade, in turn, is secured to the top of circular flange 36 by screws (not shown) passing through holes 35b in separator blade 44 and engaging threads in holes 35a in flange 36. Holes 35b also may be countersunk. Alternatively, separator blade 44 and flange 36 may be of unitary construction.

The separator blade 44 is vertically spaced from the top of flange 36 by circular spacing member 37, preferably formed as an integral part of the lower surface of the separator blade, as shown in FIG. 5, and having a diameter less than that of the separator blade. The thickness of spacing member 37 is greater than the thickness of the flanges of the plates or other containers to be dispensed.

As shown in FIG. 5, at the bottom of shaft 31 upper cammed spacemaker blade 42, lower cammed spacemaker blade 38, and spacer 40 are concentrically mounted. Each spacemaker blade has a horizontally protruding lobe (43, 39) which preferably is symmetrical with respect to the blade diameter. Diametrically opposite each lobe, the margin of the blade is cut away to form cutout regions 33, 41. Preferably, the regions 33, 41 are defined by two radii subtending an angle of approximately 90°, shown in FIG. 9, which angle is approximately bisected by the blade diameter passing through the center of the lobe.

Spacemaker blades 38, 42 and spacer 40 are preferably held in place on the lower end of rotor 30 by recessed retaining ring 34, having an inner diameter sufficiently large to receive flange 36 within its recess. The ring is secured to the end of the shaft by threaded member 32 passing through a hole in the retaining ring and engaging a threaded concentric hole in the center of the end of the shaft. With the retaining ring in place, the spacemaker blades 38, 42 and their associated spacer 40 are sandwiched between the lower face of separator blade 44 and the edge of retaining ring 34, upper spacemaker blade 42 being held flush with spacing member 37 beneath separator blade 44. Additional spacers or shims (not shown) can be placed between spacing member 37 and upper spacemaker blade 42 as needed to adjust the distance between the separator blade and the upper spacemaker blade to accommodate various size containers. The spatial relationship between the rotor elements is best shown in FIG. 6. This construction is advantageous in facilitating removal of spacemaker blades 38, 42 for maintainance or inspection, which can be accomplished simply by removing screw 32 and retaining ring 34, without disturbing the other elements of the rotor, and for placing additional spacers or shims (not shown) between spacing member 37 and upper spacemaker blade 42, as described above, and between upper spacemaker blade 42 and lower spacemaker blade 38, to accommodate various size containers. However, alternative rotor constructions which retain the general spatial relationship between the various blades and spacers described above and shown in FIGS. 5 and 6 may be used without departing from the scope and spirit of the present invention.

Alignment of the various rotor components with respect to one another is preferably accomplished by providing a guide rod 46 secured to the bottom face of collar 48 and projecting vertically downward, as shown in FIG. 5. It is preferable if rod 46 is secured by pressing its upper end into a hole provided in the bottom face of collar 48.

This downwardly protruding guide rod passes vertically through holes 45a, 45b, 45c and 45d in separator blade 44, upper cammed spacemaker blade 42, spacer 40, and lower cammed spacemaker blade 38, respectively. These four components of rotor 30 can be rotated to align guide holes 45a–45d for receiving the guide post. Thus guide post 46, in combination with guide holes 45a–45d, assures that blades 44, 42 and 38 will be correctly oriented with respect to one another as shown in FIGS. 5 and 6 when rotor 30 is assembled.

The assembled rotor mounted in the bed plate 20 of a plate dispensing machine is illustrated in FIG. 6. It will be noted from FIG. 6 that the rotor is journaled to bed plate 20 with drive pulley 28 protruding above the bed plate 20, and with collar 48, separator blade 44, spacemaker blades 38, 42 and spacer 40 all being located below the bed plate.

As described above the containers used with the present invention have sidewalls sloping inwardly from top to bottom. While the angle of slope from the vertical of the container sidewalls is not critical to the operation of my invention, it is also apparent that as the sidewalls approach either the vertical or the horizontal, at some point the operation of my dispensing apparatus is impeded. The point at which this occurs, of course, depends upon many factors, e.g., speed of operation.

Dispensing of the individual plates is accomplished by simultaneously rotating counterclockwise each of the pair of cooperating rotor assemblies associated with a stack of plates by a drive means. In FIG. 2 this drive means is illustrated by motor 27, treaded drive belt 26', guide pulleys 29, and drive pulleys 28a–28h engaging the treads of the belt. However, any alternative drive means for imparting uniform simultaneous counterclockwise rotation to the rotor assemblies can be used without departing from the spirit or scope of this invention. For example, the dispensing rotors can be driven from the same power source which drives conveyor belt 26. Alternatively, belt 26 could be replaced by a drive chain, and pulleys 28a–28h by drive gears engaging the drive chain.

The preferred method for dispensing an individual container from the bottom of one of the stacks, according to the present invention, will be described with reference to FIGS. 6–10.

FIGS. 9, 10 show the beginning of the dispensing cycle, the previous cycle having ended with the dispensing of bottommost plate 58. New bottommost plate 62 and the remainder of the stack 22 are initially supported by separator blade 44, as shown in FIG. 10. As noted above, the flange of the bottommost plate is bent upward at the points of support due to the weight of the stack bearing down on those points. As the rotors advance approximately 45° from their position of FIGS. 9, 10, leading edges 53a of cutout regions 53 on separator blades 44 pass beneath the flange of the new bottommost plate 62, and the stack of plates drops down to the top of upper spacemaker blade 42. It should be noted, at this point, that the diameter of the separator blades in their cutout regions 53 is sufficiently small so that when the cutout regions pass beneath the flange of the bottommost plate, the flange is no longer supported by the separator blade and thus the plate and stack are free to drop to the top of upper spacemaker blade 42, as described above.

With the stack 22 now being supported on upper spacemaker blade 42, the rotors continue to turn so that cam lobes 39, 43 impinge on the sidewalls of bottommost plate 62 in the stack. At this point the rotors have advanced approximately 180° from their position in FIGS. 9, 10, i.e., to the position shown in FIGS. 7, 8. The spacemaker blades 38, 42 thus apply opposing inward radial compressive forces to the external sidewalls of the bottommost plate 62 in stack 22, thereby deforming the bottommost plate as shown by the phantom line in FIGS. 7,8. This deformation of the bottommost plate causes the remainder of the nested stack to rise vertically, as shown by the vertical arrow in FIG. 8, creating gap 60 between the flanges of the deformed bottommost plate 62 and penultimate plate 64.

It will be recalled that the interior surfaces of the containers used with the present invention are preferably coated with polyester or polyethylene, to make them grease and water resistant. These coating materials facilitate the creation of gap 60 by reducing the frictional force between the coated interior of bottommost plate 62 and the exterior of penultimate plate 64. With the rotors in the position shown in FIGS. 7,8, deformation of the bottommost plate is at a maximum, and likewise the size of gap 60 is at a maximum. As shown in FIGS. 7, 8, leading edges 49a are in the gap between the flanges. Of course, however, the separator is so constructed so that the leading edges 49a do not interfere with the vertical rise of the nested plates.

It will also be appreciated from FIGS. 7, 8 that to provide even compression to the sidewalls of bottommost container 62, the diameter of upper spacemaker blade 42, and the dimensions of its cam lobe 43, are made slightly smaller than the corresponding dimensions of lower spacemaker blade 38 and its cam lobe 39. This difference exists because, as discussed above, the containers used with my invention have sloping sides. Thus to avoid applying uneven compressive forces to the upper and lower part of the container sidewall, the upper blade and its associate lobe are preferably smaller than the lower blade and its associated lobe.

Moreover, the function of spacing members 37 and 40 can be observed in FIG. 8. The flange of bottommost plate 62 is received in the space created by spacer 37 between the margin of separator blade 44 and the top surface of upper spacemaker blade 42. And the vertical separation between upper spacemaker blade 42 and lower spacemaker blade 38 created by spacer 40 in the preferred embodiment of my invention allows the spacemaker blades to apply compressive forces at two points on the outer wall of bottommost plate 62, thereby increasing their effectiveness.

After the leading edge 49a of separator blade 44 is inserted into the gap 60 between the flanges of the bottommost and penultimate plate as shown in FIGS. 7, 8, the rotors advance about 45° to the position shown in FIG. 6. In FIG. 6, the lobes of the spacemaker blades are no longer bearing on the sidewalls of the bottommost plate 62; thus compression of that plate is relaxed and the plate, being elastic, has substantially returned to its original shape. In addition, relaxing compression on the bottommost plate has permitted the remainder of the stack to descend vertically until the flange of penultimate plate 64 is resting on separator blade 44.

With the rotor in its position of FIG. 6, the stack of plates 22 resting on the penultimate plate 64 is supported entirely by the separator blade 44, while the bottommost plate 62 is supported only by upper spacemaker blade 42. With the rotors in this position, the bottommost plate has been separated from the remainder of nested stack 22, and is ready to be dispensed.

Completing the description of the cycle, FIGS. 9, 10 show the rotors advanced approximately 180° from their position of FIGS. 7, 8 and approximately 135° from their position of FIG. 6. The flange of the bottommost plate in nested stack 22 is no longer being supported by spacemaker blades 38, 42, those blades having now been rotated such that cutout regions 33, 41 are beneath the container's flange. It will be appreciated that the diameter of both the upper and lower spacemaker blades in cutout regions 33, 41 must be sufficiently small so that the bottommost plate is unsupported by the blades when the rotors are in the position shown in FIGS. 9, 10, and thus will drop vertically into the empty holder positioned below the stack.

Gravitational force acting on bottommost plate will cause that plate to drop when unsupported by the spacemaker blades. However, to avoid interference with the rotors as they advance past their position of FIGS. 9, 10, the bottommost plate must drop below the lowest spacemaker blade on the rotor. With the rotors turning at a high rate for high speed dispensing, the time interval for the bottommost plate to clear the rotors is short. Thus, to permit high speed operation, a downward force (in addition to the force of gravity) is applied to the bottommost plate by dispensing lobes 51. As can be seen from FIGS. 9, 10, the rounded leading edges 51a of the dispensing lobes 51 are contacting the top flange of the bottommost plate, pushing the plate downward as shown by the arrow in FIG. 10. When the rotors are turned slowly, however, leading edges 51a do not contact the top of the flange of the bottommost plate, for the bottommost plate will have dropped below the position of plate 58 in FIG. 10 when the rotors reach their FIG. 10 position. The penultimate plate in stack 22, which becomes the new bottommost plate as the rotors travel past the position shown in FIGS. 9, 10, is shown in FIG. 10 with its flange resting on top of separator blade 44, as noted above in describing the beginning of the cycle.

It will be appreciated that the compression of the sidewalls of the containers can be accomplished with means other than the rotor-driven cams described in the most preferred embodiment of my invention. For example, compression could be achieved by reciprocating fingers moving in and out horizontally to bear on the sidewalls of and deform the bottommost plate when moved in, and to release compression on that plate when withdrawn. Moreover, separation of the bottommost plate could be achieved by a set of separating fingers which are moved into the gap created when the bottommost plate is compressed, and which remain in place after the compressing fingers are withdrawn.

It can also be appreciated that the spacemaker blades need not be mounted on the same rotor shafts as the separator blades, as they are in the preferred embodiment of my invention described above. For example, separate rotors could be provided for the cammed spacemaker blades and for the separator blades.

In still another preferred embodiment of my invention, a single spacemaker blade (upper blade 42) per rotor can be used in the rotating screw-type apparatus of FIGS. 1–10 described above. Dispensing from a stack of up to 300 plates 4" in diameter is possible with the single spacemaker blade embodiment of my invention. Using two spacemaker blades, however, dispensing from a stack of 550 4" plates is possible. It is also contemplated that three or more spacemaker blades can be used in each rotor, making it possible to dispense from correspondingly larger stacks of containers. And it is also possible, as an alternative to the two-rotor per stack embodiment of my invention discussed herein, to use three or more cooperating rotors per stack, all simultaneously driven at the same rate, counter-clockwise as shown in FIG. 2. A three-rotor embodiment of my invention, for example, is well-suited to dispensing of plates of larger diameter (e.g., 9"), while the two-rotor embodiment works well with 4" diameter plates.

Moreover, it is contemplated that separator blade 44 could be modified to provide dispensing when the rotors are driven clockwise as shown in FIG. 2. Such modifications would principally involve reversing dispensing lobe 51 and bladed lower edge 49, and other minor modifications all of which are within the spirit and scope of the present invention.

It is also clear that the method and apparatus of the present invention are applicable to the dispensing of non-round (e.g., square or rectangular) containers.

Moreover, the general principles of the method and apparatus of the present invention are applicable also to reciprocating dispensing machine operation. In such operation, for example, cammed rotors would turn counterclockwise approximately 180° from an initial position to bear on the sidewalls and thereby compress the bottommost container, at which point a suitable separating means can be inserted in the gap created by the compression. Thereafter, the cammed rotors would return to their initial position by turning *clockwise* approximately 180°, thereby relaxing compression of the bottommost container and releasing the bottommost container to permit it to drop away from the rest of the stack.

And it will be appreciated that the invention disclosed herein is not limited to the dispensing of pressed paperboard containers, but is equally applicable to containers made of other flexible, elastic materials, e.g., plastic.

I claim:

1. Apparatus for the dispensing of flexible, elastic flanged containers having non-vertical sides from the bottom of a nested stack of said containers, comprising:
   (a) a base;
   (b) first means on the base for supporting said nested stack of containers;
   (c) compressive means on the base for creating a gap between the flanges of the bottommost and penultimate container by applying opposing compressive forces to the sidewalls of said bottommost container to cause the containers nested in the bottommost container to rise vertically;
   (d) separating means on the base, said separating means being arranged and constructed for insertion into said gap created by said compressive means, said separating means also being arranged and constructed so that it may support the penultimate container and the remainder of the stack nested in the penultimate container; and
   (e) means for releasing the bottommost container from said base and from the remainder of the containers in said nested stack.

2. The apparatus of claim 1, wherein said compressive means comprises a first rotary cam means and a second rotary cam means.

3. The apparatus of claim 2 wherein said first rotary cam means comprises two cams affixed to a first vertical shaft and said second rotary cam means comprises two cams affixed to a second vertical shaft, said shafts being journaled to the base for rotation, and further wherein the cams are arranged and constructed so that each cam may compress the non-vertical sidewalls of a bottommost container with substantially the same force.

4. The apparatus of claim 1, further comprising decompressive means on the base for causing said containers nested in said bottommost container to descend vertically until the penultimate container and the remainder of the stack above the penultimate container are supported by said separating means by relaxing the compressuve forces applied to said bottommost container.

5. The apparatus of claim 4, further comprising means for transferring said remainder of said nested stack from said separating means to said first means on said base for supporting said nested stack of containers.

6. The method of dispensing flexible flanged containers having non-vertical sides from the bottom of a nested stack of said containers, comprising the steps of:
   (a) supporting said stack of nested containers;
   (b) creating a gap between the flanges of said bottommost and the penultimate container in said stack by compressing the non-vertical sidewalls of the bottommost container, causing the containers nested in said bottommost container to rise;
   (c) inserting separating means into the gap created by said compressing; and
   (d) dispensing said bottommost container by releasing the bottommost container while at the same time maintaining support for the remainder of said stack of containers.

7. The method of claim 6 further comprising the step of relaxing the compression on the sidewalls of the bottommost container in the stack after step (c), but before step (d).

8. The method of claim 6 wherein the non-vertical sidewalls of said bottommost containers are compressed by the lobes of rotating cams.

9. The apparatus of claim 1, wherein said compressive means comprises a first reciprocating element and a second reciprocating element arranged and constructed to oppose said first reciprocating element.

10. The apparatus of claim 1, wherein said separating means comprises a first rotating element and a second rotating element, said first and second rotating elements each having an edge for inserting into the gap created between the flanges of the bottommost and penultimate containers.

11. The apparatus of claim 1, wherein said separating means comprises a first reciprocating element and a second reciprocating element, said first and second reciprocating elements being constructed and arranged for insertion into the gap between the flanges of the bottommost and penultimate containers.

12. The apparatus of claim 5, wherein said compressive means and said decompressive means comprise a first rotary cam means affixed to a first vertical shaft, and a second rotary cam means affixed to a second vertical shaft, said shafts being journaled to the base for rotation.

13. The apparatus of claim 12, wherein said separating means comprises a first rotary separator blade affixed to said first vertical shaft above said rotary cam means and a second rotary separator blade affixed to said second vertical shaft above said second rotary cam means, said separator blades each having an edge for inserting into the gap created between the flanges of the bottommost and penultimate containers.

14. The apparatus of claim 13, wherein said transferring means comprises cutaway sections of each of said rotary separator blades, said cutaway sections being constructed and arranged so that the bottommost container is unsupported when said cutaway sections are rotated under the flange of the bottommost container to permit the stack to drop to said first supporting means.

15. The apparatus of claim 14, wherein said first supporting means comprises said rotary cam means affixed to said first and said second vertical shafts, said cam means being arranged and constructed to support the flanges of the bottommost plate in the stack when said stack is transferred from said separating means.

16. The apparatus of claim 15, wherein said releasing means for the bottommost container comprises cutaway sections of each of said rotary cam means, said cutaway sections being constructed and arranged such that the bottommost container is unsupported when said cutaway sections are rotated under the flange of the bottommost container.

17. The apparatus of claim 16, wherein said rotary cam means comprises two cammed blades affixed to said first vertical shaft and two cammed blades affixed to said second vertical shaft.

18. The apparatus of claim 17, wherein said cammed blades are arranged and constructed such that each cam compresses the non-vertical sidewalls of the bottommost container with substantially the same force.

19. The method of claim 6, wherein the non-vertical sidewalls of said bottommost container are compressed by reciprocating elements.

20. The method of claim 6, wherein the step of compressing the non-vertical sidewalls further comprises applying substantially equal opposing compressive forces to said sidewalls at two vertically-spaced points.

21. A rotor for use in screw-type dispensing apparatus for dispensing flexible and elastic flanged containers having non-vertical sidewalls from a nested stack, comprising:
(a) a shaft;
(b) means on the shaft for coupling the shaft to external drive means for rotating the shaft;
(c) a separator blade mounted on the shaft; and
(d) a first cammed blade mounted on the shaft below the separator blade, said blade having a cam lobe and further having a segment of its margin substantially opposite the cam lobe cut away to form a first cutout section.

22. The rotor of claim 21, wherein said first cammed blade and said separator blade are vertically spaced from one another by a distance greater than the flange thickness of the containers to be dispensed.

23. The rotor of claim 21, wherein a portion of the margin of said separator blade is edged, said edge having a leading portion and a trailing portion, and a substantial segment of the non-edged margin of said separator blade adjacent said leading edge portion being cut away to form a second cutout section.

24. The rotor of claim 23, wherein said separator blade and said first cammed blade are constructed and arranged on the shaft with respect to one another such that said leading edge portion of the separator blade is positioned approximately over the cam lobe of said first cammed blade, and said first cutout section of said cammed blade is positioned under the segment of the non-edged margin of said separator blade that is not cut away.

25. The rotor of claim 24, further comprising a downwardly projecting dispensing lobe on the margin of said separator blade, said lobe being located substantially opposite the leading edge of the bladed portion of said separator blade.

26. The rotor of claim 24, further comprising a second cammed blade mounted on said shaft below said first cammed blade, said second cammed blade having substantially the same orientation with respect to said separator blade as said first cammed blade.

27. The rotor of claim 26, wherein the cam lobe of said second cammed blade is larger than the cam lobe of said first cammed blade.

28. The rotor of claim 26, further comprising a collar mounted on said shaft above said separator blade, said collar carrying a downwardly projecting guide rod on its lower face, said separator blade and said first and second cammed spacemaker blades each having a hole for receiving said guide rod for aligning said blades with respect to one another when the rotor is assembled.

* * * * *

UNITED STATES PATENT AND TRADEMARK OFFICE
CERTIFICATE OF CORRECTION

PATENT NO. : 4,180,180
DATED : December 25, 1979
INVENTOR(S) : Carl Fries, Jr.

It is certified that error appears in the above-identified patent and that said Letters Patent are hereby corrected as shown below:

Col. 3, line 9, "Add" should be --And--.

Col. 3, line 29, "containters" should be --containers--.

Col. 6, line 4, "On" should be --One--.

Col. 7, line 4, "52a" should be --53a--.

Col. 12, line 30, "compressuve" should be --compressive--.

Col. 13, line 15, Before "rotary" insert --first--.

Signed and Sealed this

Seventeenth Day of June 1980

[SEAL]

Attest:

SIDNEY A. DIAMOND

Attesting Officer

Commissioner of Patents and Trademarks